United States Patent
Kubinski

(10) Patent No.: US 9,403,472 B2
(45) Date of Patent: Aug. 2, 2016

(54) RECREATIONAL VEHICLE WITH DRIVING AND LIVING COMPARTMENTS

(76) Inventor: Piotr Kubinski, Köln (DE)

(*) Notice: Subject to any disclaimer, the term of this patent is extended or adjusted under 35 U.S.C. 154(b) by 1232 days.

(21) Appl. No.: 12/982,957

(22) Filed: Dec. 31, 2010

(65) Prior Publication Data

US 2011/0204676 A1 Aug. 25, 2011

(30) Foreign Application Priority Data

Feb. 19, 2010 (DE) ...................... 20 2010 002 571 U

(51) Int. Cl.
*B60P 3/32* (2006.01)
*B62D 31/04* (2006.01)
*B62D 33/06* (2006.01)

(52) U.S. Cl.
CPC . *B60P 3/32* (2013.01); *B62D 31/04* (2013.01); *B62D 33/0612* (2013.01)

(58) Field of Classification Search
CPC ............ B60N 2/01; B60P 3/32; B60P 3/325; B60P 3/33; B60P 3/36; B60P 3/38; B62D 31/04; B62D 33/06; B62D 33/0612
USPC ................ 296/26.01, 156, 64, 210, 164, 178; 180/14.1, 12; D12/84, 89
See application file for complete search history.

(56) References Cited

U.S. PATENT DOCUMENTS

| | | | | |
|---|---|---|---|---|
| D85,394 S | | 10/1931 | Prestigiacomo | |
| D140,209 S | | 1/1945 | Goodykoontz | |
| D148,066 S | * | 12/1947 | Henrichsen | D12/84 |
| D153,851 S | * | 5/1949 | Brodton | D12/89 |
| D154,742 S | * | 8/1949 | Brodton | D12/89 |
| D174,727 S | | 5/1955 | Williams | |
| D175,464 S | * | 8/1955 | Gagoux | D12/84 |
| D190,635 S | * | 6/1961 | Jerome | D12/89 |
| 3,347,589 A | * | 10/1967 | Sirk | 296/164 |
| D212,214 S | * | 9/1968 | Zoltok | D12/84 |
| 3,494,656 A | * | 2/1970 | McIntire | 296/156 |
| 3,637,252 A | * | 1/1972 | Metsker | 296/205 |
| D223,103 S | * | 3/1972 | Harvey, Jr. | D12/89 |
| 3,758,147 A | * | 9/1973 | Burton | 296/156 |
| 3,961,716 A | * | 6/1976 | Renaud | 414/537 |
| D249,495 S | * | 9/1978 | Wallace et al. | D12/99 |
| 5,104,177 A | * | 4/1992 | Thomas, Jr. | 296/210 |
| 5,967,583 A | * | 10/1999 | Wishart | 296/156 |
| 6,729,678 B1 | | 5/2004 | Atcravi | |
| 6,899,375 B2 | * | 5/2005 | Sankrithi et al. | 296/156 |
| 7,147,268 B2 | * | 12/2006 | Winter | 296/156 |
| 7,431,366 B2 | * | 10/2008 | Sankrithi et al. | 296/26.01 |
| 7,451,853 B2 | * | 11/2008 | Hartley | 180/320 |
| 2011/0204676 A1 | * | 8/2011 | Kubinski | 296/156 |

FOREIGN PATENT DOCUMENTS

| | | |
|---|---|---|
| DE | 8203376 U1 | 7/1982 |
| DE | 8909745 U1 | 11/1989 |
| DE | 10306021 B4 | 8/2009 |

* cited by examiner

*Primary Examiner* — Gregory Blankenship
(74) *Attorney, Agent, or Firm* — Smartpat PLC

(57) ABSTRACT

A recreational vehicle is described, which comprises a living department and a driving department. The driving department is elevated above the living department, providing windows to all sides for driver and passengers to enjoy surround view while travelling. The driving compartment comprises sufficient seats for all occupants of the recreational vehicle while travelling. Seats in the living compartment are not used while driving.

11 Claims, 5 Drawing Sheets

RECREATIONAL VEHICLE WITH DRIVING AND LIVING COMPARTMENTS

CLAIM FOR PRIORITY

This application claims priority to German application number DE 20 2010 002 571.0 which was filed in the German language on Feb. 19, 2010, and which is hereby incorporated by reference.

TECHNICAL FIELD

The present invention generally relates to recreational vehicles, and more particularly, to recreational vehicles having a driving and a living compartment.

BACKGROUND OF THE INVENTION

Recreational vehicles, or motor homes, are large motor vehicles which comprise a living quarters. Recreational vehicles typically have a front seat row with a driver's seat and a front passenger seat, which jointly form a driving area. The driving area seamlessly extends into a living area behind the driving area. In some cases the driver's seat and front passenger seat can rotate, so they can face rearward while the vehicle is parked. Rear passenger seats are typically formed as multifunctional seats in the living area, which serve as chairs or a bench while the vehicle is parked, and can also be used as rear passenger seats while the recreational vehicle is driving.

Conventional recreational vehicles, however, have several disadvantages. While often being used to travel scenic routes, the view out of the recreational vehicle is limited, especially for rear passengers riding in the living area. Also, rear passengers located in the living area are distant to the driver and front passenger, making it difficult to carry a conversation.

Since the driving area in conventional recreational vehicles is at the same level with the living area, unsecured objects may during a crash be projected from the living area into the driving area, causing a danger to the driver and the front passenger of the recreational vehicle.

Further, poor visibility from the driver's seat make conventional recreational vehicles difficult to navigate, especially when parking Recreational vehicles often have a roofline far above the driver's head, making it difficult for the driver to correctly estimate the height of the vehicle. Those vehicles are prone to collisions with low hanging objects, bridges, etc.

Therefore, in light of the problems associated with existing approaches, there is a need for improved recreational vehicles that eliminate the disadvantages of the known, conventional designs.

SUMMARY OF THE INVENTION

A recreational vehicle, also referred to as a motor home, is disclosed which comprises a driving compartment and a living compartment. The driving compartment provides sufficient seats for all occupants of the recreational vehicle while driving. More specifically, the driving compartment comprises a driver's seat, a front passenger's seat, and seats for rear passengers. Seats in the driving compartment may be individual formed seats. All seats in the driving compartment are equipped with safety belts, and may include other equipment to legally occupy the seats while driving.

The driving compartment comprises a driving compartment floor, which is located at a driving compartment floor elevation above the ground. Correspondingly, the living compartment comprises a living compartment floor, which is located at a living compartment floor elevation above the ground. The driving compartment floor elevation of the disclosed recreational vehicle is above the living compartment floor elevation. The living compartment is located underneath and behind the driving compartment.

Similarly, the driving compartment roof is located at a driving compartment roof elevation, while the living compartment roof is located at a living compartment roof elevation. The driving compartment roof elevations is above the living compartment roof elevation. More specifically, the driving compartment roof elevation is at least 30 cm above the living compartment roof elevation, and may be 50 cm, 70 cm, 90 cm, or even 110 cm above the living compartment roof elevation. In absolute numbers the living compartment roof elevation may for example be between 2.5 m and 3.5 m above the ground, and the driving compartment roof elevation may be between 3.2 m and 4.0 m above the ground.

The driving compartment is formed similar to the upper body of a car. The driving compartment roof is mounted onto pillars, which extend vertically from the sides of recreational vehicle's body. More specifically, the driving compartment roof is held by A-pillars in the front of the driving compartment, B-pillars in the center, and C-pillars in the rear of the driving compartment. Alternatively, the driving compartment roof may be held only by A-pillars in the front and C-pillars in the back, omitting the B-pillars in the middle.

A windshield extends along the front of the driving compartment between the left and the right A-pillar, the vehicle body and the driving compartment roof. Front side windows are located between the A-pillar, B-pillar, the driving compartment roof, and the vehicle body. Rear side windows are located between the B-pillar, C-pillar, the driving compartment roof, and the vehicle body. A rear window is located between the C-pillars, the driving compartment roof and the living compartment roof. Alternatively, in an embodiment without B-pillars, side windows are located between A-pillar, C-pillar, the driving compartment roof, and the vehicle body.

The driving compartment comprises controls and equipment to drive the recreational vehicle, such as a steering wheel, accelerator- and brake pedal, electrical controls, etc. The driver's seat, front passenger seat, and rear passenger seats are equipped with safety equipment such as safety belts, as may be mandated by law.

The living compartment is intended to only be used when the recreational vehicle is parked. The living compartment may be separated into areas or rooms serving various functions, such as for example a kitchen, a bathroom, a dining area, and one or more bedrooms. The living compartment contains furniture and equipment such as for example a toilet, a sink, washer, dryer, refrigerator, stove, kitchen counter, cabinets, beds, chairs, benches, television, closets, and storage compartments. Typical equipment contained in a recreational vehicle is described in U.S. Pat. No. 6,729,678, which is hereby incorporated by reference thereto in its entirety.

While the living compartment may comprise seating, such as chairs or benches, those are not envisioned to be used while driving. Therefore, seating located in the living department is not equipped with seat belts or other safety devices to protect occupants while driving.

The windows around the driving compartment are either located entirely above or partially extend above the living compartment roof elevation, thereby providing the occupants (driver and passengers) in the driving compartment surround view that is unobstructed by the living compartment. The driver's elevated seat position allows the driver to overlook the recreational vehicle, making it easier to navigate the vehicle, especially when parking. The driver's seat position allows the driver to accurately judge the recreational vehicle's height, since the driver's head is close to the driving compartment roof, which is the highest elevation of the recreational vehicle. The risk of collisions with low objects such as low bridges, trees, overhangs etc. is reduced.

In known recreational vehicles unsecured objects located in the living department can be projected forward during a collision, and pose a threat to occupants. In contrast, the disclosed recreational vehicle's driving compartment elevated position relative to the living compartment eliminates this risk of injuries. The flight path of any unsecured objects from the living compartment during a collision runs below the driving compartment. Since all occupants of the recreational vehicle are in the driving compartment while the recreational vehicle is driving, the safety benefit of the elevated driving compartment extends to all occupants, i.e. driver, front passenger, and rear passengers.

The driver's seat, front passenger's seat and rear passenger seats are located such that the driver's and passenger's eyes when seated in the driving compartment are above the living compartment roof elevation. This provides driver and passengers a surround view around the vehicle, which is especially desirable when travelling scenic routes, as is often done with recreational vehicles.

The driving compartment is enclosed by a windshield in the front and a rear window in the back. The windshield extends between the A-pillars in the front of the driving compartment, from a lower edge to an upper edge. The lower edge of the windshield is at about the same elevation as the driver's seat, thereby providing good forward and downward visibility from the driver's seat. The windshield's upper edge is close to the driving compartment's roof. The rear window is located between the driving compartment roof and the living compartment roof. Side windows extend above the living compartment roof elevation to the driving compartment's roof.

To further improve the view from the driving compartment the driving compartment's roof may comprise a sunroof opening, or be partially or entirely made of glass.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
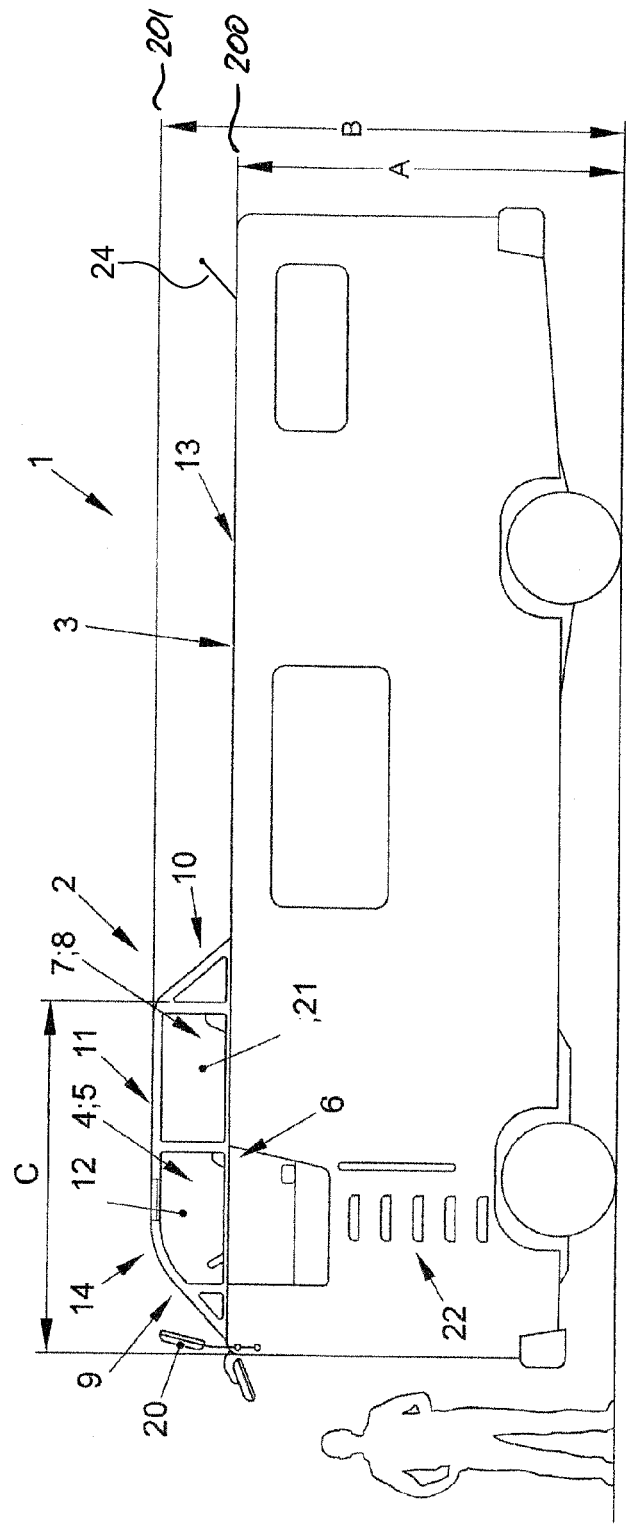
FIG. 1 is an illustrative side view of a recreational vehicle.

Referring to FIG. 1, a recreational vehicle or motor home 1 is shown. Recreational vehicle 1 comprises a driving compartment 2 and a living compartment 3. The living compartment contains furniture and equipment for living (not illustrated), for example a table, a kitchen, and one or more beds or bedrooms. Recreational vehicle 1 may be used for camping, or vacationing in alternating locations. Driving compartment 2 and living compartment 3 are connected, so that occupants can move between driving compartment 2 and living compartment 3.

Figure 2:
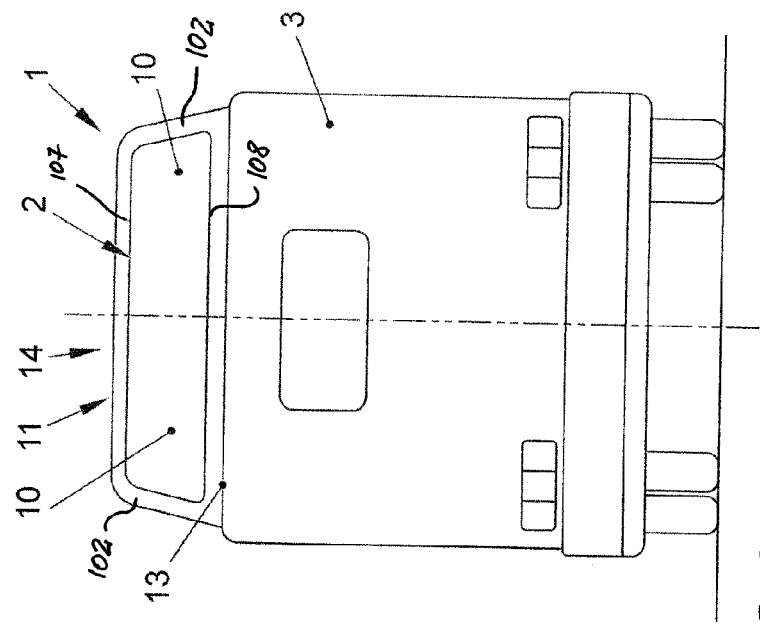
FIG. 2 is an illustrative front view of a recreational vehicle.
Figure 3:
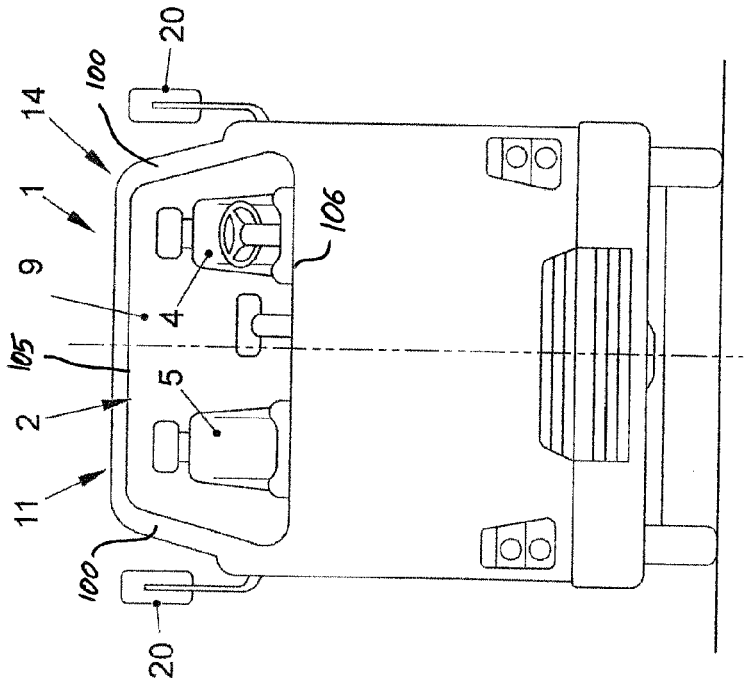
FIG. 3 is an illustrative rear view of a recreational vehicle.
Figure 4:
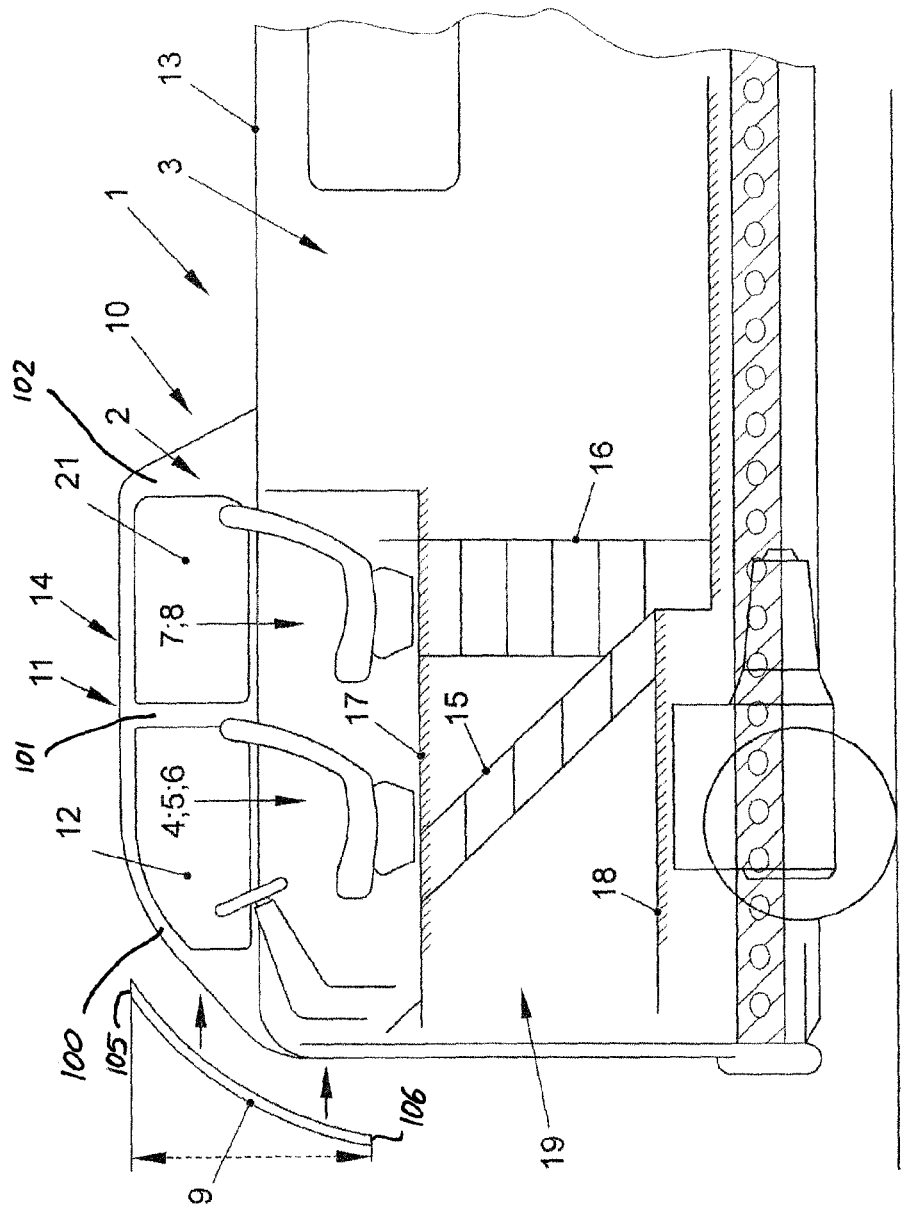
FIG. 4 is a schematic, partially cut side view of the front portion of a recreational vehicle.

Driving compartment 2 comprises seats for all occupants of recreational vehicle 1 for use while driving. As shown in FIG. 2 located within driving compartment 2 are a driver's seat 4, and front passenger's seat 5. Driver's seat 4 and front passenger's seat 5 form a front seating row 6. As shown in FIG. 4 driving compartment 2 further comprises a rear seating row 7, which is being formed by rear passenger seats 8. Rear seating row 7 may comprise one or more seats. While two seating rows 6, 7 are shown it should be understood, that the driving compartment may also comprise only one front seating row 6, or three or more seating rows (not shown).

Driving compartment 2 is enclosed by windows. A windshield 9 is located at the front of the driving compartment, between a left and a right A-pillar 100. Windshield 9 is large, extending from an upper edge 105 close to the driving compartment's roof 11 down to a lower edge 106. Lower edge 106 is located at about the elevation of driver's seat 4 and front passenger's seat 5. The position of lower edge 106 provides good forward visibility for the driver and passengers seated in driving compartment 2. Preferably, lower edge 106 is within 70 cm, within 50 cm, or even within 20 cm of the driver's seat elevation.

A rear window 10 having an upper edge 107 and a lower edge 108 is located between C-pillars 102, extending between the driver compartment's roof 11 and the living compartment's roof 13.

Front side windows 12 are located between A-pillars 100 and B-pillars 101, extending between the driver compartment's roof 11 and living compartment roof elevation 200. Rear side windows 21 are located between B-pillars 101 and C-pillars 102, extending between the driver compartment's roof 11 and living compartment roof elevation 200. As illustrated in FIG. 4, B-pillars 101 extend vertically from about living compartment roof elevation 200 to driving compartment roof 11. B-pillars 101 are horizontally placed between the front seating row 6 and rear seating row 7. Consequently, front side windows 12 are associated with the head position of the driver and front passenger seated in driver's seat 4 and front passenger seat 5. Rear side windows 21 are associated with the head position of rear passengers seated in rear passenger seats 8. While side windows 12 and 21 are shown to extend from about the living compartment roof elevation 200 to about the driving compartment roof 11, it should be understood that the lower edge of side windows 12 and 21 may be below living compartment roof elevation 200, thereby further improving side-downward visibility for occupants in the driving compartment 2.

Driver and passengers seated in driving compartment 2 have good surround view, limited only by A-pillars 100, B-pillars 101, and C-pillars 102. A-pillars 100, B-pillars 101 and C-pillars 102 are vertically extending members, connecting the driver compartment's roof 11 with the body of recreational vehicle 1. To further improve the view from the driving compartment 2 the driving compartment's roof 11 may comprise a sunroof opening, or be made partially or entirely of glass.

Some components of recreational vehicle 1 may be mounted on top of or protrude through the living compartment's roof 13 and extend above living compartment roof elevation 200. Such components may be, for example, an exhaust pipe, a radio antenna 24, a cellular telephone antenna, a television antenna, a ventilation cover, an air inlet, a turn indicator light, and a brake light. The surround view of occupants from the driving compartment may be restricted by such components.

All windows, i.e. windshield 9, front side windows 12, rear side windows 21 and rear window 10 extend above the living compartment roof elevation 200, which is a horizontal plane at an elevation A of the living compartment's roof 13. Seats 4, 5, and 8 are located such, that driver and passenger can easily look through windshield 9, side windows 12, 21, and rear window 10. More specifically, the anticipated eye position of driver and passengers sitting in the driving compartment is above living compartment roof elevation 200, so that living compartment 3 does not obstruct the horizontal view of driver and passengers seated in the driving compartment.

Figure 5:
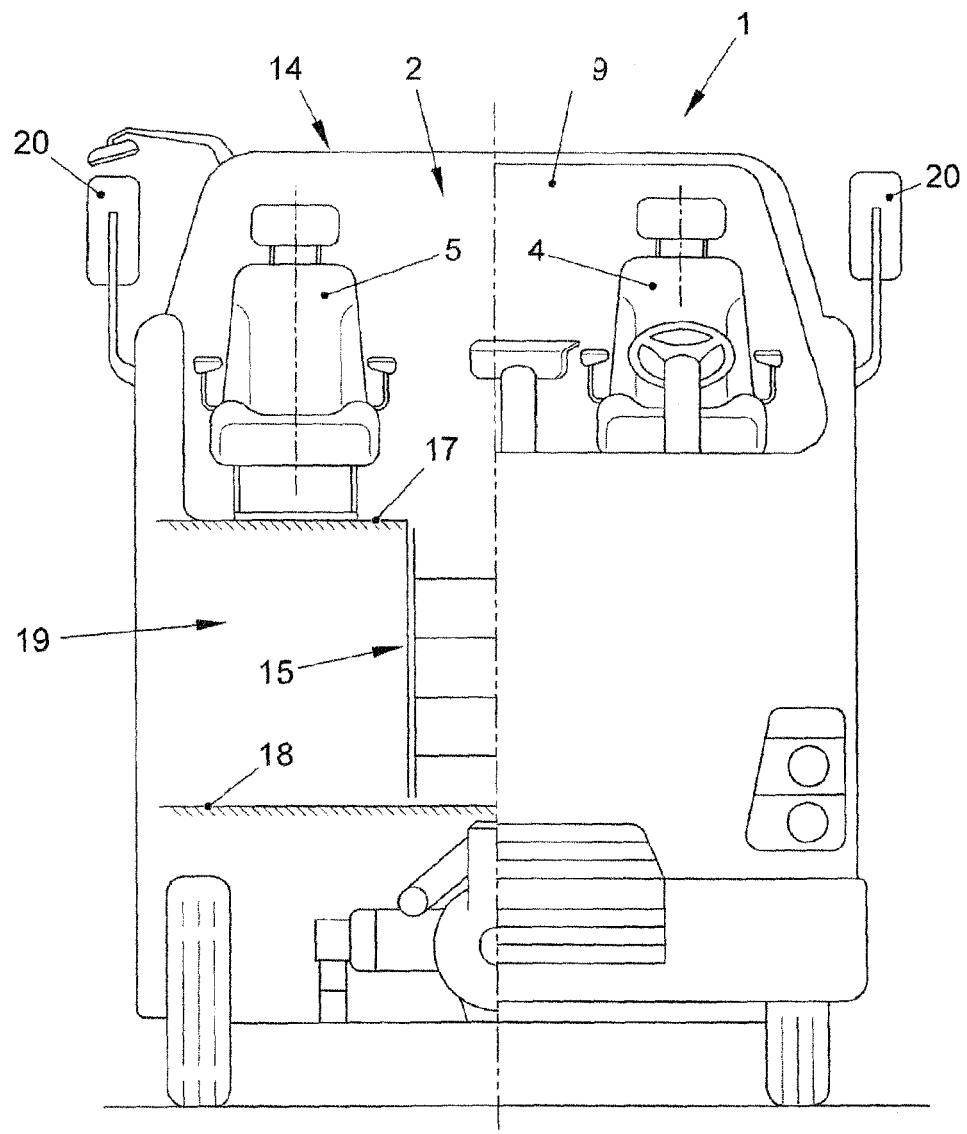
FIG. 5 is a schematic, partially cut front view of a recreational vehicle.

Driving compartment 2 of recreational vehicle 1 is elevated relative to living compartment 3. As is illustrated in FIG. 4 and FIG. 5, driving compartment 2 and living compartment 3 are connected by a staircase 15, a ladder 16, or both. The elevated position of driving compartment 2 relative to living compartment 3 provides a safety benefit, in that unsecured objects which may be projected forward from living compartment 3 during a collision, do not cause a threat to the vehicle's occupants seated in driving compartment 2. The potential trajectory of any unsecured object in the living compartment 3 runs below seats 4, 5, and 8, at about the elevation of staircase 15 or ladder 16.

The structure of driving compartment 2 is similar to the upper body of a car, and may be constructed to use components from an existing car to limit investment into metal tools. A-, B-, and C-pillars (100, 101, and 102) are favorably designed to provide the same structural strength and safety of modern cars.

The car-like structure of driving compartment 2 combines the surround view of a car with the utility of a recreational vehicle.

Illustrated in FIG. 1 is a living compartment roof elevation 200, and a driving compartment roof elevation 201. Height A of living compartment roof elevation 200 may be 2.9 m. Height B of driving compartment roof elevation 201 may be 3.4 m. In this example driving compartment roof 14 is located 70 cm higher than living compartment's roof 13. In preferred embodiments the driving compartment roof elevation 201 at height B is at least 30 cm above the living compartments roof elevation 200 at height A, i.e. B−A>30 cm. By maintaining B−A>30 cm driver and passengers seated in driving compartment 2 are provided good view rear through rear window 10.

Illustrated in FIG. 1 is further the length C of driving compartment 2, measured from the front of recreational vehicle 1 to the upper edge 107 of rear window 10. Length C is preferably about 2.5 m.

An exterior ladder 22 on the outside of recreational vehicle 1 may be provided to enter driving compartment 2 from the outside without having to walk through living compartment 3. Exterior ladder 22 may also be used as an emergency escape from driving compartment 2.

Seats 4, 5, and 8 are mounted onto a driving compartment floor 17. Below driving compartment floor 17 is living compartment floor 18, which is part of living compartment 3. Living compartment 3 may have floors at various heights, as illustrated in FIG. 4. The area between living compartment floor 18 underneath driving compartment 2 and driving compartment floor 17 may, for example, be used as a storage compartment 19.

Outside rear view mirrors 20 are provided on the outside of driving compartment 2. Preferably, outside rear view mirrors 20 are located partially or entirely above living compartment roof elevation 200. Outside rear view mirrors 20 are designed to comply with applicable safety standards and regulations, and may be known car or truck mirrors.

Figure 6:
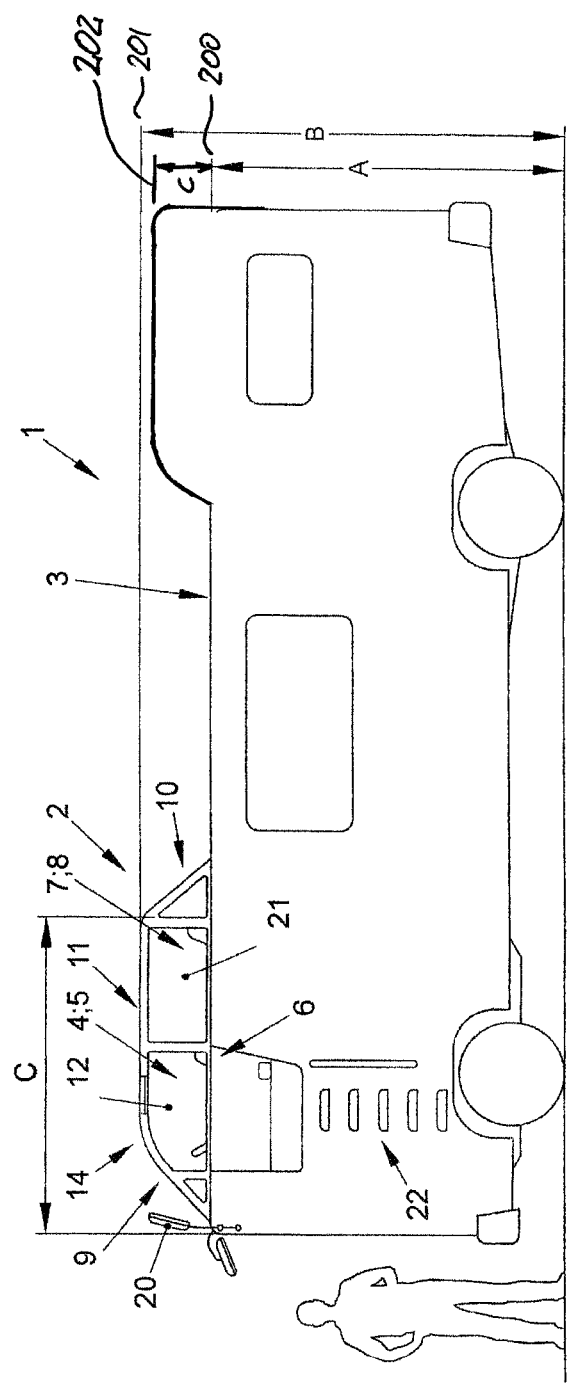
FIG. 6 is an illustrative side view of a recreational vehicle having a segmented roof with two distinct living compartment roof elevations.

As illustrated in FIG. 6, the living compartment may have a segmented roof, having two or more distinct living compartment roof elevations. A first living compartment roof section at a lower roof elevation 200 is located adjacent and behind the driving compartment in a middle section of the recreational vehicle. A second living compartment roof section at a higher roof elevation 202 is in the rear of the recreational vehicle. Rear living compartment roof elevation 202 may be higher or lower than driving compartment roof elevation 200. While the higher rear living compartment roof elevation 202 may hinder surround view from the driving compartment 2, the elevated location of a living compartment roof at the rear of the recreational vehicle only affects a relatively small angular of view from the driving compartment. The increased space underneath the elevated living compartment roof, which may e.g. be used as a garage for a secondary vehicle, or to generally increase the available volume of living space, may be worth the trade-off of slightly reduced surround view from the driving compartment.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A recreational vehicle for four or more occupants comprising:
    a driving compartment having a driving compartment floor located at a driving compartment floor elevation, a driving compartment roof located at a driving compartment roof elevation, and four or more seats for all occupants of the recreational vehicle while driving;
    a windshield, side windows, and a rear window, located around the driving compartment; and
    a living compartment located underneath and behind the driving compartment, the living compartment including a living compartment floor located at a living compartment floor elevation and a living compartment roof located at a living compartment roof elevation,
    wherein the driving compartment roof elevation is above the living compartment roof elevation, and the windshield, side windows, and the rear window extend at least partially above the living compartment roof elevation,
    thereby providing the occupants a horizontal surround view.

2. A recreational vehicle as in claim 1, wherein the four or more seats for all occupants of the recreational vehicle in the driving compartment comprise a driver's seat, a front passenger seat, and rear passenger seats.

3. A recreational vehicle as in claim 1, wherein the living compartment comprises seating, the seating in the living compartment not having seat belts.

4. A recreational vehicle as in claim 1, wherein the living compartment is configured not to be occupied while driving.

5. A recreational vehicle as in claim 1, wherein the driving compartment roof elevation is at least 30 cm above the living compartment roof elevation.

6. A recreational vehicle as in claim 1, further comprising at least one component mounted on top of the living compartment roof and extending above the living compartment roof elevation.

7. A recreational vehicle as in claim 6, wherein the at least one component mounted on top of the living compartment roof is selected from the group consisting of an exhaust pipe, a radio antenna, a cellular telephone antenna, a television antenna, a ventilation cover, an air inlet, a turn indicator light, and a brake light.

8. A recreational vehicle as in claim 1, wherein at least one of the windshield, the side windows, and the rear window are located entirely above the living compartment roof elevation.

9. A recreational vehicle as in claim 1, wherein the living compartment roof elevation is between 2.5 m and 3.5 m, and wherein the driving compartment roof elevation is between 3.2 m and 4.0 m.

10. A recreational vehicle as in claim 1, wherein the living compartment comprises at least one member from the group consisting of a toilet, a sink, a washer, a dryer, a refrigerator, a stove, a kitchen counter, a cabinet, a bed, a chair, a bench, a television, a closets, and a storage compartment.

11. A recreational vehicle as in claim 1, wherein the living compartment roof comprises a first living compartment roof section adjacent to the driving compartment roof and a second living compartment roof section located behind the first living compartment roof section, the first living compartment roof section being at the living compartment roof elevation and the second living compartment roof section being above the living compartment roof elevation.

\* \* \* \* \*